(12) United States Patent
Shimamura et al.

(10) Patent No.: US 7,146,558 B2
(45) Date of Patent: Dec. 5, 2006

(54) TIME CODE TRANSMISSION METHOD AND TIME CODE TRANSMISSION APPARATUS

(75) Inventors: Yukio Shimamura, Hirakata (JP); Toru Yamashita, Hirakata (JP); Akiyuki Noda, Shijonawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 700 days.

(21) Appl. No.: 10/469,528

(22) PCT Filed: Nov. 5, 2002

(86) PCT No.: PCT/JP02/11500

§ 371 (c)(1),
(2), (4) Date: Sep. 2, 2003

(87) PCT Pub. No.: WO03/041406

PCT Pub. Date: May 15, 2003

(65) Prior Publication Data

US 2004/0088625 A1    May 6, 2004

(30) Foreign Application Priority Data

Nov. 7, 2001    (JP) .......................... P2001-341860

(51) Int. Cl.
*G06F 11/10*    (2006.01)
*H03M 13/00*    (2006.01)
*H04N 11/20*    (2006.01)
*H04N 7/01*    (2006.01)

(52) U.S. Cl. ..................................... 714/807; 348/441
(58) Field of Classification Search ................ 714/807, 714/799, 746, 814
See application file for complete search history.

(56) References Cited

U.S. PATENT DOCUMENTS 5,990,964 A * 11/1999 Ogawa et al. ............. 348/441
6,559,890 B1 * 5/2003 Holland et al. ............ 348/441
7,023,486 B1 * 4/2006 Takayama .................. 348/441

* cited by examiner

*Primary Examiner*—Shelly Chase
(74) *Attorney, Agent, or Firm*—McDermott Will & Emery LLP

(57) ABSTRACT

As a pre-processing step for transmitting a timecode, a checking information is retrieved from a linear time code (LTC). A checking data is created using the retrieved checking information. The checking data is superimposed on a vertical interval time code (VITC). As a post-processing step for transmitting a timecode, meanwhile, collating information corresponding to the checking information is retrieved from the LTC. A collating data is created using the retrieved collating information. Then, the checking data is retrieved from the received VITC. The retrieved checking and collating data are collated to verify, thereby, the presence or absence of errors in the received LTC.

10 Claims, 1 Drawing Sheet

TIME CODE TRANSMISSION METHOD AND TIME CODE TRANSMISSION APPARATUS

TECHNICAL FIELD

The present invention relates to a method of and an apparatus for transmitting a timecode which is created to be superimposed on an image signal.

BACKGROUND TECHNIQUE

A timecode superimposed on an image signal includes LTC (Linear Timecode), which is, as a consequence of the biphasemark modulation, recorded in the band of audio frequencies, and VITC (Vertical Interval Timecode), which is, as a consequence of the NRZ modulation, transmitted at vertical intervals.

These timecodes are subject to the occurrence of errors (change of the data content), which is caused by defective retrieval or transmission when reproduced by a reproducing apparatus or transmitted. Such errors cause the accuracy of the timecodes to degrade, therefore it is necessary to detect with high accuracy any error occurred in the timecodes. To be able to detect the errors will offer options such as choosing not to use any erroneous timecode or amending any erroneous portion in the timecode by applying a predetermined processing thereto.

In this regard, the VITC includes in the data thereof CRC code (Cyclic Redundancy Checking Code), by which the occurrence of errors can be detected with high accuracy. However, no methods or structures for detecting errors in the LTC have ever been implemented, and neither has any effective suggestion been advanced.

Therefore, a main object of the present invention is to provide a method of and an apparatus for transmitting a timecode capable of effectively detecting errors occurred in the LTC.

DISCLOSURE OF THE INVENTION

1. In order to achieve the object, the present invention has the following structure:

A timecode transmission method for simultaneously transmitting LTC (Linear timecode) and VITC (Vertical Interval Timecode) which are correlated according to the present invention includes, as a pre-processing step when transmitting a timecode, a step of retrieving a checking information from the LTC to create a checking data using the retrieved checking information and a step of superimposing the checking data on the VITC.

The present invention further includes, as a post-processing step after the timecode has been received, a step of retrieving a collating information corresponding to the checking information from the received LTC to create a collating data using the retrieved collating information and a step of retrieving the checking data from the received VITC and collating the retrieved checking data with the collating data to verify the presence or absence of errors in the received LTC.

A timecode transmission method and apparatus according to the present invention characterized in the foregoing description is capable of verifying with high accuracy errors occurred in the LTC at the time of reproduction and transmission by collating the checking data retrieved from the received VITC with the collating data created from the received LTC.

In this case, it is preferable; in the pre-processing step when transmitting the timecode, to retrieve the checking information from the LTC at preset retrieving positions therein, while superimposing the checking data on the VITC at entry positions therein corresponding to the retrieving positions in the LTC; in the post-processing step after the timecode has been received, to retrieve the collating information from the received LTC at the retrieving positions therein. By doing so, the presence or absence of errors occurred in the LTC can be detected corresponding to the preset retrieving positions in the LTC.

According to the present invention, it is preferable to set the retrieving positions in every frame unit of an image signal so that the presence or absence of errors occurred in the retrieving positions in the LTC can be thereby verified per frame.

According to the present invention, it is preferable to, first, retrieve a plurality of checking and collating information from every retrieving position, and then execute a calculation processing to the retrieved plural information based on a predetermined calculation formula when creating the checking and the collating data. In this manner, errors occurred in the plural information constituting the LTC can be collectively detected at a time.

According to the present invention, it is preferable to retrieve the checking and the collating information from a user's bit in the LTC so that errors in the LTC user's bit can be thereby verified.

THE BEST MODE FOR CARRYING OUT THE INVENTION

Figure 1:
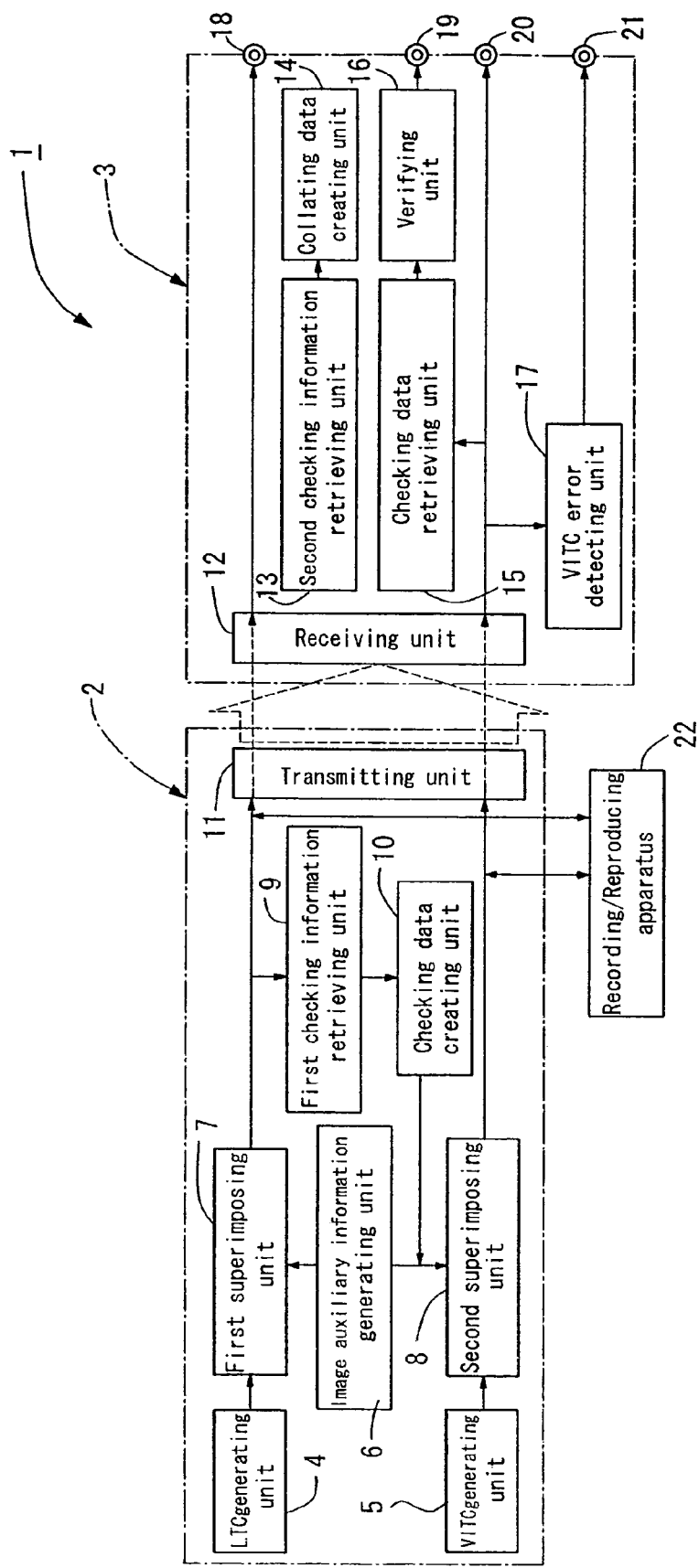
FIG. 1 is a block view showing a structure of an apparatus for transmitting a timecode according to a mode for executing the present invention.

Below described in detail is the best mode for executing the present invention with reference to FIG. 1. FIG. 1 is a block view showing a structure of an apparatus for transmitting a timecode according to the best mode for executing the present invention.

A timecode transmission apparatus 1 comprises a transmitter 2 and a receiver 3. The transmitter 2 comprises a LTC generating unit 4, a VITC generating unit 5, an image auxiliary information generating unit 6, a first superimposing unit 7, a second superimposing unit 8, a first checking information retrieving unit 9, a checking data creating unit 10 and a transmitter 11.

The receiver 3 comprises a receiving unit 12, a second checking information retrieving unit 13, a collating data creating unit 14, a checking data retrieving unit 15, and a verifying unit 16 and a VITC error detecting unit 17. The LTC generating unit 4 generates LTC. The VITC generating unit 5 generates VITC. The LTC and VITC are generated in a correlated status corresponding to an image signal not shown. The image auxiliary information generating unit 6 generates an image auxiliary information corresponding to respective frames in an image data. The image auxiliary information will be described later.

The first superimposing unit 7 superimposes the image auxiliary information on the LTC. The first checking information retrieving unit 9 retrieves a checking information from the LTC at respective frame positions therein. The retrieved checking information will be described in detail later.

The checking data creating unit 10 creates a checking data from the checking information retrieved by the first checking information retrieving unit 9. The method of creating the checking data will be described later.

The second superimposing unit 8 superimposes the image auxiliary information and the checking data on the VITC. The transmitting unit 11 transmits the LTC and VITC to the receiver 3. It is unnecessary to restrict the method of the transmission, for which a wire or wireless transmission may be an option.

The receiving unit 12 receives the LTC and VITC transmitted from the transmitter 2. The second checking information retrieving unit 13 retrieves a collating information from respective frame positions in the received LTC.

The collating information is retrieved by the second checking information retrieving unit 13 in the same manner as the checking information is retrieved by the first checking information retrieving unit 9. The details will be described later.

The collating data creating unit 14 creates a collating data through a calculation processing using the collating information retrieved by the second checking information retrieving unit 13 based on a predetermined calculation formula.

The checking data retrieving unit 15 retrieves the checking data from the received VITC. The verifying unit 16 collates the checking data with the collating data to verify the presence or absence of errors occurred in the received LTC. The VITC error detecting unit 17 executes the cyclic redundancy check using a CRC cord superimposed on the VITC to detect the presence or absence of errors occurred in the received VITC.

Referring to the figure, a reference numeral 18 shows a LTC output terminal for outputting LTC received by a receiving unit 12 from a receiver 3 to outside. 19 shows a verification result output terminal for outputting a verification result by a verifying unit 16 from the receiver 3 to outside. 20 shows a VITC output terminal for outputting VITC received by the receiving unit 12 from the receiver 3 to outside. 21 shows a VITC error detection result output terminal for outputting an error detection result by a VITC error detecting unit 17 from the receiver 3 to outside. 22 shows a recording/reproducing apparatus for recording generated LTC and VITC on a transmitter 2 side and reproducing the recorded LTC and VITC upon a request from the transmitter 2 side to output them to a transmitter 2.

According to the mode for executing the present invention, the first checking information retrieving unit 9 and the checking data creating unit 10 constitute a checking data creating apparatus. The second superimposing unit 8 constitutes a superimposing apparatus. The second checking information retrieving unit 13 and the collating data creating unit 14 constitute a collating data creating apparatus. The checking data retrieving unit 15 and the verifying unit 16 constitute a verifying apparatus. However, the described structures are an example of executing the present invention. Needless to say, the present invention accepts any structure capable of exerting the functions cited in the claims.

The image auxiliary information is hereby described. As an example of the image auxiliary information, an effective frame information can be mentioned. The effective frame information is hereby explained. An image data corresponding to an optional image format may occasionally be converted to an image data corresponding to an image format having a number of frames per second different than that of the optional image format. Such a conversion results in an increased or decreased number of frames per second.

When executing the format conversion which results in an increased number of frames per second, the amount of an image data constituting the frames (hereinafter referred to as frame image data) increases after the conversion. Therefore, at least one frame image data out of the frame image data prior to the conversion is, as a frame image data, redundantly written in the image data after the conversion In the case of the format-converted image data as described, it is required to selectively pick an effective frame image data out of the redundantly recorded frame data (of the redundantly written data, one which is the closest time-wise to a real time position at the time of recording). The reason for that is to reduce a recording capacity at the time of nonlinear editing, and so on.

When such a format conversion is executed, the following processing is applied to the timecode. In the timecode corresponding to the image format after the conversion, a flag information is superimposed to be recorded at a frame position corresponding to an effective frame. In the timecode corresponding to the image data after the format conversion, the effective frame is designated according to the effective frame information. The flag information equals the effective frame information.

Hereinafter is described a method of transmitting a timecode using the timecode transmission apparatus according to the mode for executing the present invention.

To start, a step executed by the transmitter 2 is described. Firstly, the LTC generating unit 4 generates LTC. The VITC generating unit 5 generates VITC. The image auxiliary information generating unit 6 generates an image auxiliary information.

Then, the image auxiliary information is superimposed on the LTC by the first superimposing unit 7. The image auxiliary information is superimposed by being written in respective user's bits (binary group) set in respective frame information in the LTC. The LTC having the image auxiliary information superimposed thereon is outputted to the transmitting unit 11.

The LTC outputted to the transmitting unit 11 is also supplied to the first checking information retrieving unit 9. The first checking information retrieving unit 9 retrieves a checking information from the supplied LTC. The checking information comprises, for example, a bit information constituting the information unit of a data group constituting the respective frame information in the LTC (eg. four bit information constituting the information unit of the data group). The first checking information retrieving unit 9 retrieves the checking information from the LTC at every frame therein. The first checking information retrieving unit 9 retrieves a plurality of checking information at every frame unit of an image signal. The first checking information retrieving unit 9 can determine the checking information to be retrieved by identifying the retrieving positions in the checking information to be retrieved. Below is the description based on the assumption that four kinds of checking information A–D are retrieved from the LTC at every frame unit therein.

The checking information A–D retrieved by the first checking information retrieving unit 9 is supplied to the checking data creating unit 10. A checking formula is precedently set and recorded in the checking data creating unit 10. The checking formula can adopt a variety of calculation formulas such as an addition, multiplication, division or other formulas, or a compound formula with some of them combined can be used. Below is the description based on the case of adopting an addition.

The checking data creating unit 10 executes a calculation processing to the supplied checking information A–D according to a stored formula. This case is based on the assumption that a calculation result (A+B+C+D) is obtained according to the calculation processing using an addition.

The checking data creating unit 10 outputs the calculation result (A+B+C+D) as a checking data. The checking data is outputted per frame in the LTC. For reference, when the calculation is executed and the calculation result (A+B+C+D) produces a large quantity of data, the information of a few lower bits in the calculation result (A+B+C+D) (eg. eight bits) may be employed as the calculation result.

The checking data is supplied to the second superimposing unit 8. The image auxiliary information is, together with the checking data, supplied to the second superimposing unit 8, which superimposes the checking data and the image auxiliary information on the VITC. The checking data is, together with the image auxiliary information, superimposed, for example, by being written in the respective user's bits (binary group) constituting respective frame information in the VITC. The VITC with the checking data and the image auxiliary information superimposed thereon is outputted to the transmitting unit 11, and the LTC and the VITC are, as the need arises, outputted to the recording/reproducing apparatus 20 to be recorded therein. Further, the recording/reproducing apparatus 20, as the need arises, reproduces the recorded LTC and VITC to output them to the transmitter 2 (more specifically, the transmitting unit 11).

The transmitting unit 11 transmits the LTC and VITC generated in the transmitter 2 and the LTC and VITC supplied by the recording/reproducing apparatus 20 to the transmitter 3. The transmitting unit 11 transmits the LTC and VITC in the coordinated status. In that case, errors possibly occur in the data constituting the transmitted LTC and VITC due to instabilities in transmission or reproduction on the recording/reproducing apparatus 20 and so on.

A step executed by the receiver 3 is described below.

The LTC and VITC received by the receiver 12 directly pass the receiver 3 to be outputted from the LTC output terminal 18 and the VITC output terminal 20 to outside. In that case, the LTC is supplied to the second checking information retrieving unit 13. The VITC is supplied to the checking data retrieving unit 15 and the VITC error detecting unit 17.

First, a method of detecting errors in the received VITC is described. The VITC error detecting unit 17 retrieves a CRC cord from the VITC input from the receiving unit 12, and thereby executes the cyclic redundancy check to detect the presence or absence of errors in the received VITC. The VITC error detecting unit 17 outputs the detection result from a VITC error detection result output terminal 21 to outside.

Second, a method of detecting errors in the received LTC is described. The second checking information retrieving unit 13 retrieves a collating information from the LTC supplied via the receiving unit 12. The collating information is retrieved from the LTC at every frame therein. At the time of the retrieval, the second checking information retrieving unit 13 retrieves the collating information at the same retrieving positions as those of the retrieval of the checking information by the first checking information retrieving unit 9 so that the data content of the collating information is substantially identical with that of the checking information. Hereinafter, the collating information retrieved by the second checking information retrieving unit 13 is referred to as A'–D'.

The collating information, A'–D', retrieved by the second checking information retrieving unit 13 is supplied to the collating data creating unit 14. A checking formula identical to the one stored in the checking data creating unit 10 is precedently set and stored in the collating data creating unit 14. The collating data creating unit 14 executes a calculation processing to the supplied collating information A'–D' according to the stored checking formula. It is hereby, as well as in the checking data creating unit 10 described above, assumed that a calculation result (A'+B'+C'+D') is obtained according to the calculation processing using an addition.

The collating data creating unit 14 outputs the calculation result (A'+B'+C'+D') to the verifying unit 16 as a collating data.

For reference, when the calculation is executed and the calculation result produces a large quantity of data, the information of a few lower bits in the calculation result (A'+B'+C'+D') (eg. eight bits) may be employed as the calculation result as in the checking data creating unit 10. It is noted that a common processing should obviously be adopted in both the checking data creating unit 10 and the collating data creating unit 14.

Meanwhile, the checking data retrieving unit 15 retrieves the checking data from the VITC received by the receiving unit 12. The checking data is retrieved from the VITC at every frame therein. In the transmitter 2, the checking data is, for example, written in the user's bit in the VITC, therefore the checking data retrieving unit 15 retrieves the checking data from the received VITC at the checking data writing position therein (user's bit or the like). The checking data retrieving unit 15 supplies the retrieved checking data to the verifying unit 16.

The verifying unit 16 collates the checking data supplied by the checking data retrieving unit 15 with the collating data supplied by the collating data creating unit 14 at every frame. The verifying unit 16, when both data are identical, decides that there is no error in the frame position of the LTC. On the contrary, the verifying unit 16, when the data are not identical, decides that there are errors of any kind in the frame position of the LTC. The verifying unit 16 outputs the error detection result from the verification result output terminal 19 to the outside of the receiver 3.

The timecode transmission apparatus according to the mode for executing the present invention, through the error detection steps described above, outputs errors occurred in the VITC and LTC having been transmitted. Of these errors detected, the errors in the VITC can be detected with high accuracy because the CRC code is used. Thus, when it is decided there is no error present in the VITC, it can be concluded that the checking data in the LTC, which is superimposed on the VITC and retrieved therefrom after the transmission, has no errors.

Accordingly, when it is decided by the VITC error detecting unit 17 that there is not error present in the VITC having been transmitted, the error detection in the LTC can be regarded as accurate. This leads to the decisions stated below based on the verification results by the VITC error detecting unit 17 and verifying unit 16.

When the VITC error detecting unit 17 decides errors being present, it can be concluded that errors are present in the VITC having been transmitted, and the LTC error detection by the verifying unit 16 is impossible.

When the VITC error detecting unit 17 decides no errors being present, it can be concluded that the. VITC having been transmitted does not include any error, and the LTC error detection by the verifying unit 16 is highly accurate.

Moreover, in the timecode transmission apparatus 1 according to the mode for executing the present invention, the places of error occurrence are detectable because of having uniformly set the retrieving positions of the checking and collating information, which the checking and collating data are respectively based on.

In this case, the checking information and the collating information are retrieved at every frame, which enables identifying errors in the LTC per frame for detection. To be able to detect errors per frame offers the following advantage when executing a format conversion. When executing a format conversion resulting in an increased number of frames per second, effective frames are, as described earlier, scattered in a frame image data. The described condition may require, depending on the circumstances, an anomalistic timecode capable of stepping per effective frame. In the case of transmitting such a timecode, the transmission method (transmission apparatus) according to the present invention capable of detecting errors per frame is especially effective.

As described so far, the LTC error detection, which has been impossible, can be achieved by the timecode transmission apparatus according to the present invention. In addition to being able to detect the error occurrence during the timecode transmission, the following errors are detectable.

The timecode transmission apparatus 1 is capable of detecting inconsistencies in a relationship between an image and LTC caused by an editing process implemented with respect to VITC (including image data) during the transmission or a replacement process or the like implemented with respect to the LTC during the transmission. Such inconsistencies include, not only those in a relationship between timecode components in the LTC and the image, but also those in a relationship between an image auxiliary information written in the user's bit of the LTC and the image.

In addition, in the described mode for executing the invention, errors in the LTC are detected per frame unit by creating the checking and the collating data per frame first, to later verify them. However, error detection intervals are, of course, not limited to frame units and can be optionally set. In the described mode for executing the invention, again, a plurality of the checking and collating information is respectively retrieved to create the checking and collating data, however, a single checking and collating information can be retrieved to create the checking and collating data. In such a case, it is unnecessary to execute the calculation processing to create the checking and collating data. The checking and collating information can be directly used as the checking and collating data respectively.

POSSIBILITY OF INDUSTRIAL APPLICATION

The present invention enables error detection in LTC, which has so far been impossible. When one of LTC and VITC is modified in an editing or dubbing process, inconsistencies may occasionally be generated in a relationship between those timecodes. The present invention further enables identifying such inconsistencies.

The invention claimed is:

1. A method of transmitting a timecode for simultaneously transmitting correlated LTC (Linear Time Code) and VITC (Vertical Interval Time Code) comprising:
   as a pre-processing step when transmitting a timecode, a step of retrieving a checking information from the LTC and creating a checking data using the retrieved checking information; and
   a step of superimposing the checking data on the VITC;
   as a post-processing step after having received a timecode, a step of retrieving a collating information corresponding to the checking information from the received LTC to create a collating data using the retrieved collating information; and
   a step of retrieving the checking data from the received VITC and collating the retrieved checking data with the collating data to verify the presence or absence of errors in the received LTC.

2. The method of transmitting a timecode according to claim 1, wherein
   in the pre-processing step when transmitting a timecode, the checking information is retrieved from the LTC at preset retrieving positions therein and the checking data is superimposed on the VITC at entry positions corresponding to the retrieving positions in the LTC, and
   in the post-processing step after having received a time code, the collating information is retrieved from the received LTC at the retrieving positions therein.

3. The method of transmitting a timecode according to claim 2, wherein the retrieving positions are set per frame unit in an image signal.

4. The method of transmitting a timecode according to claim 2,
   wherein
   a plurality of the checking information is retrieved at each of the retrieving positions and the retrieved plural checking information are calculated based on a preset calculation formula to create the checking data,
   a plurality of the collating information is retrieved at each of the retrieving positions and a calculation processing is executed to the retrieved plural collating information based on the same formula as the preset calculation formula to create the collating data.

5. The method of transmitting a time code according to claim 1, wherein the checking information and the collating information are retrieved from a user's bit in the LTC.

6. An apparatus for transmitting a timecode for simultaneously transmitting correlated LTC (Linear Time Code) and VITC (Vertical Interval Time Code) comprising a transmitter and a receiver,
   the transmitter comprising:
   a checking data creating apparatus for retrieving a checking information from the LTC to create a checking data using the retrieved checking information; and
   a superimposing apparatus for superimposing the checking data on the VITC,
   the receiver comprising:
   a collating data creating apparatus for retrieving a collating information corresponding to the checking information from the received LTC to create a collating data using the retrieved collating information; and
   a verifying apparatus for retrieving the checking data from the received VITC and collating the retrieved checking data with the collating data to verify the presence or absence of errors in the received LTC.

7. The apparatus for transmitting a timecode according to claim 6, wherein
   the checking data creating apparatus retrieves the checking information from the LTC at preset retrieving positions therein;
   the superimposing apparatus superimposes the checking data on the VITC at entry positions therein corresponding to the retrieving positions in the LTC, and
   the collating data creating apparatus retrieves the collating information from the received LTC at the retrieving positions therein.

8. The apparatus for transmitting a timecode according to claim 7, wherein the checking data creating apparatus and the collating data creating apparatus set the retrieving positions per frame unit in an image signal, and the superimposing apparatus sets the entry positions per frame unit in an image signal.

9. The apparatus for transmitting a timecode according to claim 7, wherein the checking data creating apparatus, after having retrieved the plural checking information at every retrieving position, executes a calculation processing to the retrieved plural checking information based on a preset calculation formula to create the checking data, and the collating data creating apparatus, after having retrieved the plural collating information at every retrieving position, executes a calculation processing to the retrieved plural collating information based on the same calculation formula as the calculation formula to create the collating data.

10. The apparatus for transmitting a timecode according to claim 6, wherein the checking data creating apparatus retrieves the checking information from a user's bit in the LTC, and the collating data creating apparatus retrieves the collating information from the user's bit in the LTC.

* * * * *